Patented Dec. 5, 1950

2,532,980

UNITED STATES PATENT OFFICE 2,532,980

THE PRODUCTION OF BENZYL PENICILLIN

Harold B. Woodruff, Westfield, and Alma H. Larsen, Rahway, N. J., assignors to Merck & Co., Inc., Rahway, N. J., a corporation of New Jersey No Drawing. Application August 7, 1948,
Serial No. 43,155

2 Claims. (Cl. 195—36)

This invention relates to the production of penicillin, and more particularly to improved means of producing benzylpenicillin by fermentation.

Penicillin-producing fungi have varied greatly in capacity to produce penicillins. Certain improvements in their capacity have been effected through the selection of types from nature and through artificial mutation procedures. The artificial mutant known as *Penicillium chrysogenum* Q-176, which is provided by the American Type Culture Collection in Washington, D. C., and by other Type Collections, has hitherto been generally regarded as the best available producer of penicillin. The maximum penicillin production by *P. chrysogenum* Q-176 has ranged from about 900 to 1,000 International penicillin units per milliliter of fermented broth. This economically inadequate yield, which represents less than two-thirds of a milligram of penicillin per milliliter of broth, has involved the employment of extensive equipment and complicated procedures for the industrial production of penicillin.

The disadvantages of such a small yield have been intensified by the circumstance that, in the micro-biological production of penicillin, a number of penicillins, which differ chemically and biologically, occur in the fermented broth. Of these penicillins, benzylpenicillin is principally desired medically, and the proportions in which it occurs in the fermented broth have usually been thought to depend chiefly on the cultural conditions but have been found by these applicants to depend also largely on the type of fungus employed in the fermentation. Under factory production conditions, the proportion of benzylpenicillin among the total penicillins synthesized by *P. chrysogenum* Q-176 has seldom exceeded 60 per cent; that is, the fermented broth of this mutant has ranged about 540 to 600 International units of benzylpenicillin per milliliter of broth, or only a normal yield of about one-third of a milligram per milliliter.

A further disadvantage occurring in the production of penicillin by fermentation has been that the hitherto employed penicillin-producing organisms have communicated colored impurities to the mixture of penicillins produced during the fermentation processes. These commonly yellowish impurities have necessitated the purification of the crystalline salts of benzylpenicillin by repeated washes with solvents, and this practice has seriously diminished the total yields of the benzylpenicillin itself.

The applicants have produced improved types of penicillin-producing fungi which, when they are grown submerged in suitable aerated nutrient media, are particularly adapted to the production of substantially double the total quantity of penicillins made by previously known penicillin-producing fungi. This disproportionate change in the fermentation result is accompanied by the following novel advantageous circumstances. Of the total quantity of penicillins which the improved fungal types of this application synthesize in the fermented broth, the proportion of benzylpenicillin is unexpectedly increased to an average of 80 per cent or more, so that the actual quantity of benzylpenicillin produced by these improved fungi is on the order of 2½ times that which is produced by the best previous penicillin producer. Furthermore, the use in the applicants' processes of their improved fungal types, which do not secrete pigment during fermentative activity, enables the economic attainment of isolation yields of crystalline benzylpenicillin salts greater than those hitherto derived by means of any known penicillin-producing fungus.

One of the objects of this invention is to provide means of improving the production of penicillin by fermentation.

Another object of this invention is to provide improved means for the production of increased yields of benzylpenicillin during fermentation under submerged aerated conditions.

A further object is to provide fermentation processes for the production of an increased proportion of benzylpenicillin in the mixture of penicillins contained in fermented broth.

A still further object is to provide fermentation processes which, by substantially obviating the discharge of soluble pigments by penicillin-producing organisms during fermentative activity under submerged aerated conditions, permit the recovery of increased amounts of penicillin, particularly the crystalline salts of benzylpenicillin.

These and other objects will be apparent from the disclosures and the claims herein made.

The applicants have found that the Eumycetes which are particularly suitable for the attainment of these objects by the fermentation of suitable aerated nutrient media are the non-pigment-secreting, penicillin-producing types of members selected from the penicillia, provided that they are types which during fermentative activity are capable of yielding 80 per cent of the total penicillins as benzylpenicillin, and the latter in excess of two-thirds of a milligram per milliliter of fermented broth. The *P. chrysogenum* series among this group are especially serviceable, notably the mutated descendants of *P. chrysogenum*.

The fungal types defined by the standard in the immediately preceding paragraph are obtained by mutation and by selection procedures. The selection, which involves the picking out and the testing of mutated types for the existence therein of the desired standard, may follow upon either artificial or natural mutation.

A procedure is described below in illustration of the manner in which a standard fungal type such as used in this invention was obtained.

The spores of the known pigment-secreting penicillin-producing mutant *P. chrysogenum* Q–176, which had been grown on peptone-glucose agar, were suspended in sterile tap water and were then subjected to ultraviolet light from a Westinghouse sterile lamp type 3B–WL782 which had a maximum intensity at 2537 angstrom units. These spores were at a distance of 8 inches from this radiation source. The duration of this exposure to the light was one hour. The temperature throughout this exposure was 25° C.

The so-treated spores were plated in peptone-glucose agar, and transfers to agar slants were made of all colonies which developed from surviving spores. The penicillin-productivity of the resulting isolates was tested, and the highest-producing isolate was selected for the following further treatment.

The spores of this isolate were washed off in a sterile tap water, filtered through cotton, and irradiated in a shallow layer in an open Petri dish with ultraviolet light for a period of 8 minutes. The light source was a Hanovia lamp type 16200, operated at a distance of 4 inches from the spore suspension. The temperature of exposure was 25° C. The surviving spores were plated in potato-dextrose agar. Transfers to agar slants were made of spores from all individual colonies which developed. Spores from these slants selected for high penicillin-productivity were next irradiated in the latter manner. From this third irradiated series, a type was selected having the desired standard, namely, the incapacity to secrete pigments in fermentation media, but the capacity to synthesize 80 per cent of the total penicillins as benzylpenicillin, and the so-produced benzylpenicillin in excess of two-thirds of a milligram per milliliter of fermented broth.

Improved types, so produced from the mutant *P. chrysogenum* Q–176, have the principal morphological characteristics, and are thus identified as members, of the *P. chrysogenum* series of the Eumycetes. The said standard distinguishes such improved types from all known penicillin-producing members of the *P. chrysogenum* series.

It is to be understood that the foregoing example is given to illustrate, not to limit, the manner in which the improved non-pigment-secreting, penicillin-producing types of the defined standard are obtained. Various modifications of the procedures will readily occur to those skilled in the art, such as by the irradiation of either natural or artificial mutants, or by variation in the intensity or the duration of the irradiation or by variation of the means of irradiation or mutation, or by variation in the manner or the steps of selection and testing.

The fungal types having the defined standard are capable of producing improved yields of the penicillins, and particularly of benzylpenicillin, when grown from spores or vegetative material in a variety of media under a wide range of cultural conditions. Suitable media contain a source of carbon, provided by carbohydrates, such as monosaccharides, disaccharides, molasses, grains and cereal products; and a source of nitrogen, provided by nitrogen-containing salts, and nitrogenous complexes such as proteins or degraded proteins. Various mineral salts are provided in the media to supply the essential requirements of these fungal types, and a neutralizing agent is often included in the medium. The media also contain a precursor such as phenylacetylethanolamine supplying the benzyl group. Before the medium is inoculated it is sterilized by heat and pressure.

Fermentation by these improved fungal types is conducted by means of submerged growth under agitation and aeration. A preferred method of agitation is with rotating impellers operating at about 100 R. P. M., and a preferred aeration rate is about one-half volume of air per volume of medium per minute, although these methods may be modified without altering the penicillin-producing capacities of these non-pigment-secreting fungal types. Fermentations are usually conducted under positive air pressure, and at a temperature controlled within the range of 20° to 28° C.

EXAMPLE 1

A liquid medium was prepared containing 30 grams lactose, 30 grams corn-steep liquor solids, 1 gram $CaCO_3$, 1 gram phenylacetylethanolamine, 3 grams $KH_2PO_4$, and distilled water to make one liter. Portions consisting of 60 ml. of this medium were distributed into 250 ml. cotton-plugged Erlenmeyer flasks each containing 0.25 ml. soybean oil. After the sterilization of this medium for 20 minutes at 15 lbs. steam pressure, the contents of the flasks were inoculated with spores of the said standard ultraviolet-induced, non-pigment-secreting, penicillin-producing mutant. Flasks inoculated with the spores of the pigment-secreting, penicillin-producing *Penicillium chrysogenum* Q–176 were likewise prepared. Aeration was effected by agitation of the flask contents on a rotary shaker at 220 R. P. M. at 24° C.

The following results were the averages of several comparable fermentations:

*Table I*

| | Units of penicillin per ml. 5 days |
|---|---|
| Pigment-secreting *P. chrysogenum* Q–176 | 540 |
| Non-pigment-secreting mutant | 1,660 |

EXAMPLE 2

The following medium was prepared: Distillers' dried solubles, 50 grams, lactose, 30 grams, $KH_2PO_4$, 2 grams, phenylacetylethanolamine, 2 grams, and distilled water to make one liter. The medium was adjusted to pH 6.0 with KOH, and 10 grams $CaCO_3$ were added. Aliquots of 60 ml. of this medium were distributed into Erlenmeyer flasks each containing 0.25 ml. soybean oil. After sterilization, the flask contents were inoculated with vegetative material of the said standard non-pigment-secreting, penicillin-producing mutant of *P. chrysogenum*. Other conditions were the same as those in Example 1.

Table II

| Days | 3 | 4 | 5 | 6 |
|---|---|---|---|---|
| International units of penicillin produced per ml. of broth | 749 | 727 | 1,060 | 1,325 |

EXAMPLE 3

Vegetative inocula of the non-pigment-secreting mutant of Example 2 were used in a series of large-scale productions of penicillin in 10,000-gallon fermenters operated under forced aeration, with mechanical agitation, at a temperature of about 24° C., until the maximum penicillin production was reached.

The fermentation medium contained per liter: 30 grams lactose, 38 grams corn-steep liquor solids, 1 gram $CaCO_3$, 2 grams $KH_2PO_4$, 1 gram phenylacetylethanolamine, and tap water. Soybean oil was used as an anti-foam agent.

The results obtained from this series were compared with those of a similar series of fermentations conducted with a pigment-secreting, penicillin-producing, ultraviolet mutant of *P. chrysogenum* Q–176.

The following were the average results:

Table III

| | International units of total penicillins | International units of benzylpenicillin |
|---|---|---|
| | Per ml. | Per ml. |
| Pigment-secreting mutant | 860 | 605 |
| Non-pigment-secreting mutant | 1,720 | 1,410 |

It will be observed that a twofold increase in total penicillins was obtained. It will also be observed that the non-pigment-secreting mutant, in producing 82 per cent of benzylpenicillin in the total penicillins, effected a 2.3-fold increase of benzylpenicillin.

EXAMPLE 4

Fermentation conditions were the same as those described in Example 3. Seven 10,000-gallon fermenter runs were made with the non-pigment-secreting mutant of Example 2. They were compared with 10,000-gallon fermenter runs operated under exactly the same conditions, except that a pigment-secreting mutant of *P. chrysogenum* Q–176 was used to initiate the fermentation.

Upon completion of these fermentations, the resulting penicillin was separated from the fermented broths by a series of transfers between organic solvents and inorganic buffers. In these transfers, pentacetate was used as a solvent, although other solvents, such as ethyl ether, amyl acetate, and chloroform, have been found satisfactory. Suitable buffers are mixtures of potassium phosphates, or sodium carbonate.

A specific precipitant of benzylpenicillin, N-ethylpiperidine, was used to separate this benzylpenicillin from other kinds of penicillins produced during the fermentation. This precipitate, called the crude N-ethylpiperidine salt of benzylpenicillin, serves as the starting compound for recrystallization and preparation of the pure crystalline sodium salt of benzylpenicillin.

The first step in purification of the N-ethylpiperidine salt of benzylpenicillin involves successive acetone washes to remove pigmented impurities derived from the fermentation broth. As the N-ethylpiperidine salt of benzylpenicillin is somewhat soluble in the acetone wash, losses of the former occur at this stage, and no satisfactory method has been available for the recovery in substantial quantities of the benzylpenicillin removed with the pigmented materials during the acetone wash. A much reduced volume of washing is required, however, to remove pigmented materials from the N-ethylpiperidine salt obtained from these new non-pigment-secreting fungi than from the salt obtained from the benzylpenicillin of fermentations conducted with the previously used pigment-secreting organisms.

An illustration of average yield data from a series of batches run in 10,000-gallon fermenters is given below.

Table IV

| | International units of penicillin in crude N-ethylpiperidine salt | International units of penicillin lost in acetone wash | Percent of total penicillin lost in acetone wash |
|---|---|---|---|
| Non-pigment-secreting type | $16.9 \times 10^9$ | $2.12 \times 10^9$ | 12.5 |
| Pigment-secreting mutant | $12.4 \times 10^9$ | $2.62 \times 10^9$ | 21.2 |

It is seen from these data that, through the use of a non-pigmenting-secreting fungal type in the fermentation, the proportionate isolation loss due to acetone washing is diminished by 41 per cent. This improvement is in addition to the increases in total penicillins and benzylpenicillin demonstrated in Examples 1, 2 and 3.

The examples herein are given by way of illustration and not of limitation, as it is obvious that certain modifications may be made in the compositions of the media and in the steps of the fermentation process, and in the kinds and proportions of the materials employed, without departing from the spirit and the scope of the invention and the purview of the claims.

We claim:

1. A process for the production of benzyl penicillin that comprises inoculating an aqueous nutrient medium with a non-pigment secreting mutant of *Penicillium chrysogenum* Q–176, characterized as producing enhanced yields of penicillin and as producing benzyl penicillin in a proportion in excess of 80% of the total penicillins, and conducting fermentation of the inoculated medium under submerged aerated conditions.

2. A process for the production of benzyl penicillin by fermentation that comprises inoculating an aqueous nutrient medium with a culture of a mutant of *Penicillium chrysogenum* Q–176 identifiable by means of the herein described standard biochemical properties, and conducting fermentation of the inoculated medium under submerged aerated conditions.

HAROLD B. WOODRUFF.
ALMA H. LARSEN.

REFERENCES CITED

The following references are of record in the file of this patent:

Beadle et al.: Stanford University Penicillin Progress Report #5 (1945), pages 1 to 3.

Gailey et al.: Journal of Bacteriology, vol. 52, No. 1, July 1946, pages 129, 132, 136, 137, 139.

Bonner: American Journal of Botany, vol. 33, of U. S. 1946, pages 788–790.

Pontecorvo et al.: Nature, vol. 154, pages 514–5, 1944.